United States Patent [19]

Mascarello et al.

[11] 4,060,466
[45] Nov. 29, 1977

[54] PROCESS FOR PREPARING HYDROGEN FROM WATER

[75] Inventors: Jean Marius Mascarello, Versailles; Paul Godin, Louveciennes; Jacques Francois Millet, Paris, all of France

[73] Assignee: Electricite De France, Paris, France

[21] Appl. No.: 558,299

[22] Filed: Mar. 14, 1975

[30] Foreign Application Priority Data

Mar. 29, 1974 France .................. 74.11466

[51] Int. Cl.² .................. C25B 1/02; C01B 1/02; C01B 1/26
[52] U.S. Cl. .................. 204/129; 204/107; 423/481; 423/493; 423/648 R
[58] Field of Search .............. 204/257, 263, 106, 107, 204/128, 129; 423/648, 493, 481, 497

[56] References Cited

U.S. PATENT DOCUMENTS

| 2,996,356 | 8/1961 | Pennington et al. ................. 423/498 |
| 3,737,381 | 6/1973 | White et al. ...................... 204/257 X |
| 3,919,406 | 11/1975 | Grimes et al. ...................... 423/648 |

Primary Examiner—Arthur C. Prescott
Attorney, Agent, or Firm—Ostrolenk, Faber, Gerb & Soffen

[57] ABSTRACT

Process and installation for the preparation of hydrogen from water by an endothermic cycle of several successive chemical steps occurring at different temperatures with substantially total recycling of intermediates; the improvement involves in carrying out electrochemically only part of said reactions, including at least that of said reactions which occurs at the highest temperature when carried out chemically.

5 Claims, No Drawings

PROCESS FOR PREPARING HYDROGEN FROM WATER

This invention is concerned with the preparation of hydrogen from water. It is well-known that the distribution of energy from the generating stations to the consumption centres in the form of hydrogen is increasingly being contemplated. In fact, owing to the low viscosity of hydrogen this it may be distributed in the form of gas, in pipes, whereby the loss in the form of pumping power is considerably less than the losses along the line in the case of the distribution of electricity under high tension. This advantage will obviously be more noticeable when it is applied, for the production of energy, to nuclear reactors installed by the sea or on rivers at a great distance from the consumption centres. Add to this, the fact that the combustion of hydrogen, even in air, is non-pollutant, because it produces essentially water, and the distribution of hydrogen from a nuclear power station to an electricity generating station near to the consumption centres appears attractive.

At the present time, the basic hydrogen used in industry (notably for the production of ammonia and the hydrogenation of petroleum products) is produced by the action of heat and oxidizing agents on natural hydrocarbons. These solutions canot be extrapolated in the long-term, above all in the case of rationalisation of the use of hydrogen for the distribution of energy. As for the electrolysis of water, which is only used industrially for the production of very pure hydrogen required for certain applications, this must be discounted since the output is too low.

The preparation of hydrogen from water by thermal dissociation has been suggested; unfortunately, the decomposition reaction of water does not begin to be appreciable until about 2,500° C and it is not complete until an extremely high temperature is reached. In order to use only low temperatures, various cycles of chemical reactions have been suggested in the course of which all the components are regenerated with the exception of water. For an illustration of known cycles, reference may be had to "Chemical and Engineering News", volume 51, number 6 of Sept. 3, 1973, page 32 which describes a number of possible cycles. Other cycles have been developed during the nineteen sixties at the European Research Centre of Ispra. However, these cycles are complicated and the temperature at which the most endothermic reaction has sufficient speed to be of use industrially often surpasses the possibilities of the present-day nuclear reactors or those envisaged in the near future. It is known that amongst reactors, those using light water as a cooling agent and moderator do not allow a vapour temperature of more than 300° C to be obtained; as for high temperature gas-cooled reactors (H.T.G.R. in English terminology), these are designed to supply gas temperatures from 500 to 800° C, and their construction and operation are far from being completely mastered.

As a consequence, none of the processes available at the present time is capable of industrial application either because the output is not sufficient or because the temperatures required by certain of the incorporated reactions are too high.

The present invention is intended to provide a process of preparation of hydrogen improved with respect to those known until now.

To this end, there is provided a process for the preparation of hydrogen from water, by an endothermic cycle of several successive chemical reactions during which intermediary products react and are regenerated in the course of the cycle, these reactions taking place at different temperatures, characterised in that at least one of the reactions of the cycle, corresponding to only a fraction of the enthalpy variation, is carried out electrochemically.

In practice, if all the reactions of the cycle can be carried out by thermal means, it is the reaction or reactions of the cycle which become effective at the highest temperature using thermal means wich are carried out by electro-chemical means. It may be a question purely and simply of replacing a chemical reaction, which does not occur with notable kinetics except above a specific temperature, by an electrolytic reaction; equally, it may be a question of a reaction which cannot be obtained by thermal means; finally, one group of reactions of the cycle may be replaced with a different group.

The process according to the invention can be put into effect in particular in an installation which includes a nuclear reactcr with a cooling agent which has an outlet temperature higher than that necessary for the thermal reaction subsisting in the cycle, and corresponding to the highest temperature; in this case the cooling agent will firstly be expanded in a turbine, then returned as a heating fluid to the reactors where the various reactions of the cycle occur.

According to another aspect of the invention, there is provided an installation for carrying out the process of the invention comprising a nuclear reactor whose cooling agent has an outlet temperature higher than that necessary for the thermal reaction remaining in the cycle and corresponding to the highest temperature.

The invention will be better understood by reading the following description of a process which constitutes a particular embodiment which is given by way of non-limitative example and of an installation which allows this process to be carried out.

That process according to the invention may be regarded as a derivative of the known thermal cycle for cupric chloride, described schematically by the following reactions:

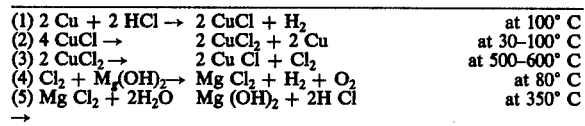

It will be seen that all the intermediary substances are regenerated and that the cycle amounts to a dissociation of water into $H_2$ (which forms a product of two of the reactions) and $O_2$.

Reaction (3) occurs at a temperature slightly above that of the others. In order to be able to carry out the whole cycle at a temperature not exceeding 350° C, it is sufficient to substitute an electro-chemical reaction for the thermal dismutation reaction of the cupric chloride, giving rise to either cuprous chloride or to copper, or both, with the separation of chlorine.

In particular, reaction (3) can be replaced with an electrolytic reaction in aqueous solution. Cupric chloride is highly soluble in water and gives rise to the following reactions of ion equilibrium:

$$Cu\,Cl_2 \rightleftarrows Cl^- + Cu\,Cl^+ \rightleftarrows 2Cl^- + Cu^{2+}$$

The quantity of cupric chloride in solution may vary within very wide limits. The products of the electrolysis change according to this level: for a very dilute solution not exceeding an amount of $10^{-2}$ mols per liter of $CuCl_2$, the only products are chlorine and copper which is deposited on the cathode. With a more concentrated solution a mixture of cuprous chloride and copper is obtained: obviously, only the cuprous chloride is then subjected to the dismutation reaction (2).

Instead of carrying out the electrolysis at room temperature in an aqueous medium, it can be carried out at high temperatures in a molten medium cupric chloride having a melting point of about 498° C, using an electric current to heat the solution by Joule effect. The increase in temperature offers the advantage of appreciably increasing the reaction speed, without in any way modifying the necessary enthalpy variation. Electrolysis in solutions can be carried out at 1.05 volts and nil current.

In all instances, a composite cycle for the preparation of hydrogen is thus obtained, and does not require at any time a temperature of 500° to 600° C, and on the other hand only requires an amount of electrical energy much below that which is necessary for electrolysis of water (the chemical reaction (3) corresponds to an enthalpy of 31,800 calories for 1 mol of $CuCl_2$ compared with 68,000 calories called for to dissociate electrolytically one mol in water).

It is not necessary to describe here the chemical reactors which allow reactions (1) (2) (4) and (5) to be carried out, nor the vessels for electrolysis which may be used for the dissociation of the cupric chloride, since all this apparatus may be of a well-known type. In particular, the electrolysis tanks which must be able of undergoing the emission of chlorine without damage may be of the type described in: "Chlorine, its Manufacture, Properties and Uses" by J. S. Sconce, published by Robert E. Krieger Publishing Company. The gases which occur may be collected and conveyed by pumps with a suitable output from one reactor to the other; the electrolysis may be carried out in batches.

The invention is of particular interest in an installation which includes a nuclear reactor which supplies gas or steam at a temperature slightly above 350° C, such as high temperature gas-cooled reactors and fast neutron reactors cooled by circulation of molten sodium. In the first instance, the gas leaving the reactor at a temperature of from 500 to 800° C is expanded in a gas turbine driving an electrical generator. The gas leaves the turbine at a temperature which is selected slightly above 350° C and is used to heat the reactor where reaction (5) takes place and, then the other reactors in order of decreasing temperature. Obviously, the circuit may be more complex and incorporate circuits for desiring part of the medium flow, especially for the control of the temperatures of the chemical reactors.

The invention is applicable to numerous other cycles of reactions, especially those in which one of the reactions takes place at a temperature substantially above that of the other reactions.

We claim:

1. In the closed cycle method for the preparation of hydrogen by an endothermic cycle of a plurality of successive chemical steps occurring at different temperatures in which the products of each chemical step other than hydrogen and oxygen are used in a successive step or recycled to a prior step, the net effect of said cycle being to break down water to its constituent elements, comprising (1) hydrolyzing magnesium chloride to magnesium hydroxide and hydrochloric acid, (2) reacting the hydrochloric acid produced in step 1 with copper to produce cupric chloride and hydrogen, (3) dismuting the cupric chloride produced in step 2 to copper and chlorine and recycling the copper thus produced to step 2, and (4) reacting the chlorine produced in step 3 with the magnesium hydroxide produced in step 1 to produce magnesium chloride, hydrogen and oxygen and recycling the magnesium chloride thus produced to step 1, the improvement which comprises effecting the dismuting of the cupric chloride electrochemically.

2. The method of claim 1 wherein the electrochemical step is effected at a temperature below that at which the corresponding chemical step would be effected.

3. The process of claim 1 wherein the highest temperature employed in said cycle does not exceed 350° C.

4. The process of claim 3 wherein an aqueous $CuCl_2$ solution is subjected to electrolysis.

5. The process of claim 1 wherein molten $CuCl_2$ is electrolyzed.

* * * * *